United States Patent [19]
Mulrine et al.

[11] Patent Number: 5,325,132
[45] Date of Patent: Jun. 28, 1994

[54] EYEWIRE LOCKING DEVICE

[76] Inventors: Brian F. Mulrine, 3547 Bay Ave., Ocean City, N.J. 08226; Eric M. Loeser, 301 Maple Ave. #235, North Plainfield, N.J. 07060

[21] Appl. No.: 970,182

[22] Filed: Nov. 2, 1992

[51] Int. Cl.$^5$ .................... G02C 5/22; G02C 11/00
[52] U.S. Cl. ............................. 351/92; 351/90; 351/96; 351/153
[58] Field of Search .............. 351/90, 92, 97, 91, 351/93, 94, 95, 96, 98, 153

[56] References Cited

U.S. PATENT DOCUMENTS

3,349,430 10/1967 Rosenvold et al. ............. 351/153
4,084,889 4/1978 Vischer, Jr. ..................... 351/153

Primary Examiner—Bruce Y. Arnold
Assistant Examiner—Thomas D. Robbins

[57] ABSTRACT

This disclosure refers to the securing of lenses in an ophthalmic mounting having a split rim eyewire using a spring loaded connecting device.

7 Claims, 9 Drawing Sheets

EYEWIRE LOCKING DEVICE

BACKGROUND OF THE INVENTION

The invention relates to spectacle frames of the split rim type, usually made of metal materials, with the rim member having a cross sectional indentation to hold the beveled edge of the lens securely. The split allows the opening of the rim when inserting or removing a lens, and endpieces are attached to the ends of the split, by solder or other means, in order to provide a method for locking the split in a closed position.

It is important that the ends of the split be held firmly together so that the lens will be locked securely in place. A lens falling out of a frame is a major inconvenience to the wearer, and frequently results in the expense of a broken lens having to be replaced. Whatever means is used for holding the split closed must not only keep the frame closed tightly, but at the same time allow the frame to be opened for occasions where the replacement of a lens may be necessary.

In the history of related art, screws have been by far the most commonly used method for holding these described endpieces together and keeping the split rim tightly closed around the lens. Unfortunately, it is very common for such screws to gradually work loose, causing a lens in some cases to fall out. Even in cases where the lens may not fall out, it is still possible that the lens can rotate within the frame, thus altering the optical properties of the glasses when prescription lenses are involved. It is particularly critical that the cylinder axis of a lens for the correction of astigmatism is maintained in the proper rotational alignment to be effective. Therefore, even minor loosening of the frame is undesirable.

The threads of the typically tiny screws used, as well as the receptor threads in the eyeglass frame, often cause additional problems by stripping out. Quite frequently a perfectly good frame can be rendered useless only because of stripped threads. A nut and bolt combination can often provide a makeshift solution to this problem, but is generally unattractive and is also subject to loosening.

Many previous attempts have been made to solve the drawbacks of screws for this application, but have been either ineffective or have introduced other disadvantages. The continued predominance of the use of screws in this regard is a strong indication of the failure of previously proposed methods to adequately fulfill all of the requirements of spectacle frames.

Designs using clips which slide or snap either onto the eyewire endpieces (patent #'s 308,344 & 2,006,917) or over the screw to prevent it from backing out (#1,882,153) have been proposed. Another approach has been the bending of certain parts to prevent loosening of the frame (#735,917) or turning of screws (#2,740,327). The problems introduced by these designs are numerous. In some cases they make insertion of the lenses during assembly of the eyeglasses awkward, which is an important consideration for the many optical laboratories which provide one hour service, where ease and speed of assembly are required. In other previous attempts the option of replacing a lens which may have been accidentally broken is impractical, particularly when parts of the frame must be restraightened and bent again during the lens replacement, leading to problems with metal fatigue. Sometimes the extra parts attached to the frame may be bulky and compromise the visual appeal of the eyewear, which is an important consideration of eyeglass wearers. In other previously designed systems, springs have been used to maintain a closing force on the opening in the eyewire (#'s 3,473,839, 3,609,018, 4,256,387, 4,360,252 & 4,813,775). None of these approaches solve the problems of screws without introducing others. In many cases, the frames are designed so that they can only be partly opened for lens insertion or removal. This can lead to problems and even hazards when trying to insert or remove glass lenses which can chip under these circumstances, thus causing lens spoilage. Some of the designs are not suitable for frames made of thin metal materials, therefore having limited application to only certain other types of frames. In other cases, the design does not allow any tolerance for lenses having anything but an absolutely precise fit for the frame. If the lenses are even the slightest amount too large, the device will not allow closure of the frame. Other methods, such as toggle levers or cam type arrangements have also been proposed ((#'s 2,730,012, 2,73,709 & 2,754,724) but are generally too bulky in appearance to be suitable for delicate frames made of thin materials. Soldering the frame closed has even been proposed (#2,104,503), but this is clearly impractical because of the adverse effects the high temperatures would have on plastic lens materials, as well as difficulties with lens replacement. Still another approach has been the design of frames where the screws are mounted transversely to the plane of the lens (#'s 1,590,719 & 3,762,804). These designs still use conventional screws, however, and in addition sometimes make assembly of the glasses more difficult because the frame must be held in a tightly closed position while the screw is being inserted. Those skilled in the art will readily admit the difficulty of holding a frame closed and keeping the lens positioned properly while simultaneously trying to engage the threads of a tiny screw into the frame.

SUMMARY OF THE INVENTION

The principle object of the invention is to provide an improved method for securely holding closed eyeglass frames of the split rim type, without loosening over time.

Another object is to allow easy replacement of lenses without the need for any tools not already at the disposal of optical technicians.

Still another object is to provide a device where slightly oversized lenses can still be mounted in the eyeglass frame.

These and other objects will become evident as the specifications for various advantageous embodiments of the device and their operation are explained in detail.

DETAILED DESCRIPTION OF THE INVENTION

Figure 1:
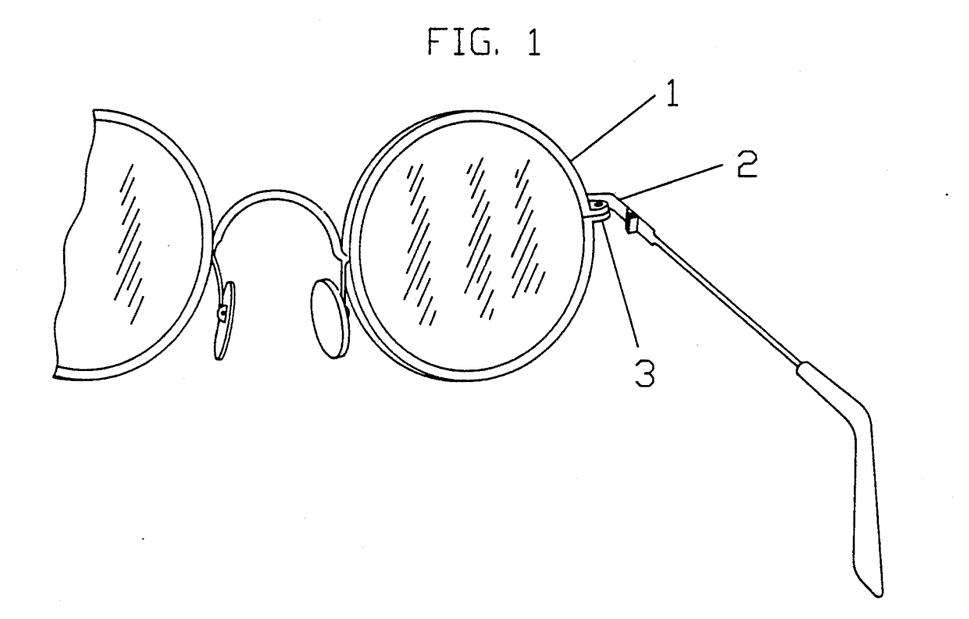
FIG. 1 shows part of a spectacle frame having a rim design as seen from the side of the frame which would face the wearer.

FIG. 1 partially shows a spectacle frame in which the lenses are held by a split rim (1), with two endpieces (2 & 3) secured to the ends of the split by solder or other means, which are used to hold the split in the normally tightly closed position.

Figure 2:
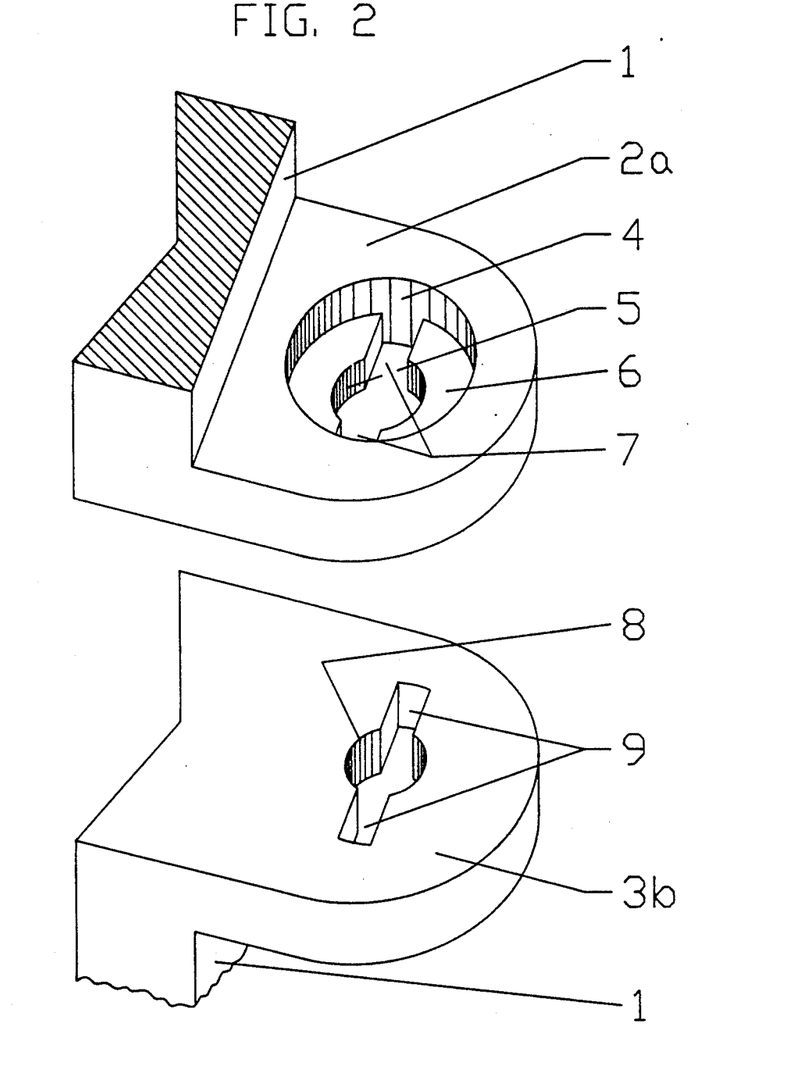
FIG. 2 is a detailed elevated perspective drawing of the rim split in a slightly open position, with the first and second endpieces attached to the rim at the ends of the split.

FIG. 2 shows, in detail, the two endpieces of the split rim (1) when the split is in the open position. Positioned in the outside face of the first endpiece (2a) is a cylindrically shaped bore or chamber (4) which extends only partially through the endpiece. Centered on the same axis is a smaller diameter bore (5) which extends through the remainder of the endpiece and out the other side. A flat shelf (6) is positioned at the bottom of the larger bore or chamber, the plane of the shelf being perpendicular to the axis of the cylinder bores. Slot shaped openings (7) extend radially outward from the center of the smaller bore as far as the perimeter of the large diameter bore.

Figure 3:
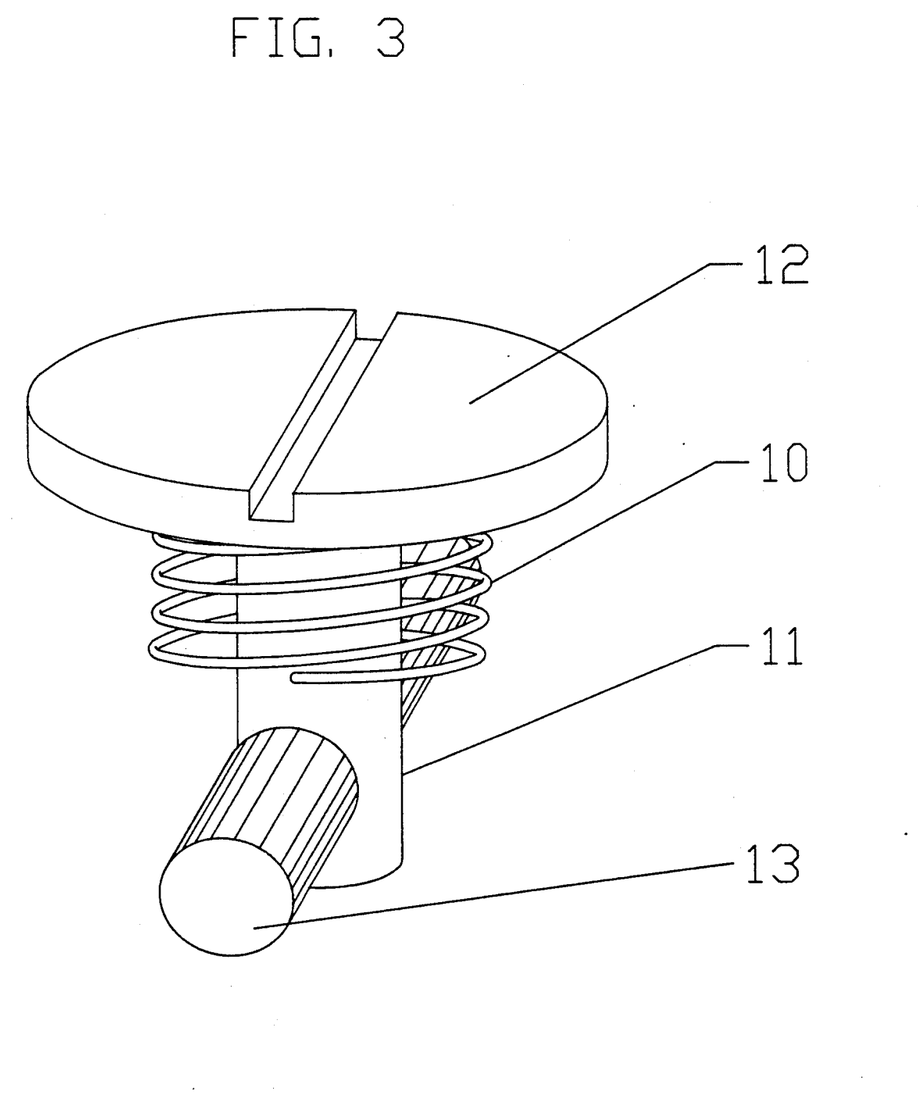
FIG. 3 is a perspective drawing of the connecting device used to hold the endpieces together.

The inside face of the second endpiece (3b) can be seen below and in close proximity to the first endpiece. The second endpiece also contains a cylindrical bore (8) of the same diameter as the small diameter bore (5) in the first endpiece, as well as slot shaped openings (9) extending radially outward from the bore, of substantially the same dimensions and oriented in the same direction as the analogous openings (7) in the first endpiece. FIG. 3 shows a connecting device, where a compression type spring (10) surrounds a cylindrical shaft (11), which at one end has a screw type slotted head (12) and at the other a pair of perpendicularly aligned lugs (13). The shaft of the connecting device is of a diameter just large enough to allow a snug fit in the smaller diameter bores located in the endpieces but not so large as to prevent free rotation within the bores. The diameter of the connecting device head and spring is slightly smaller than the larger bore in the first endpiece, so that the bore can act as a chamber to house the spring and the screw head can be recessed therein.

Figure 4:
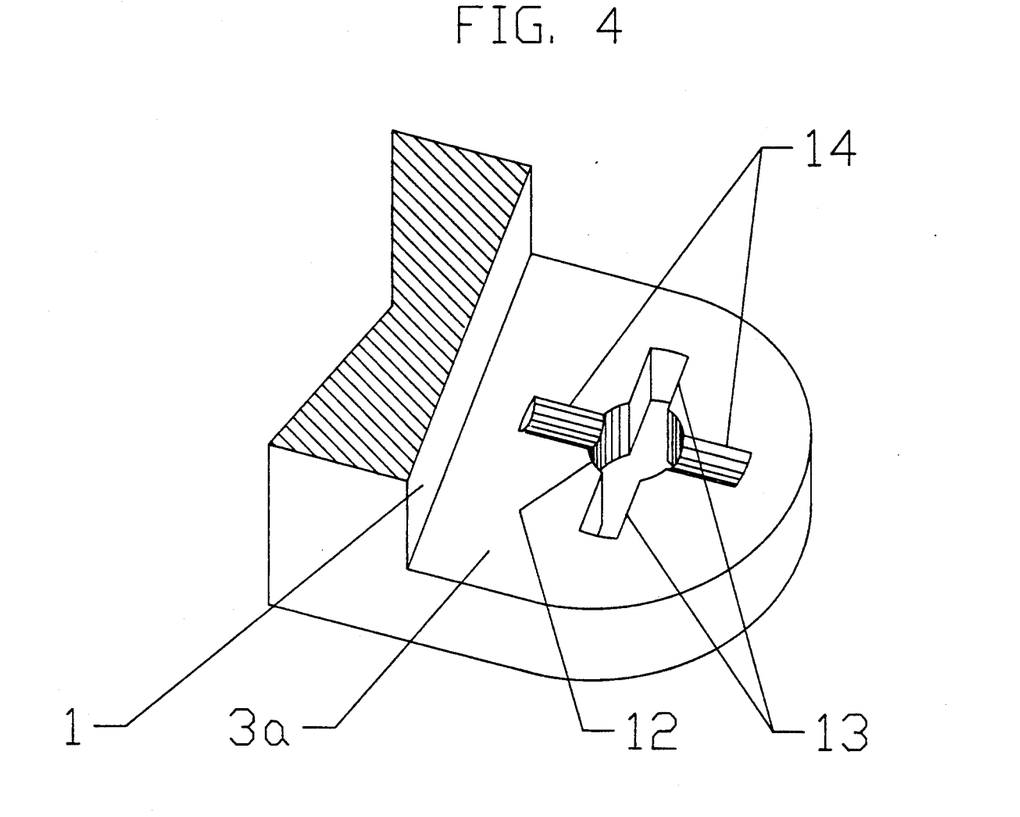
FIG. 4 shows the opposite face of the lower endpiece as was seen in FIG. 2.

FIG. 4 shows the outside face (3a) of the second endpiece, with the small diameter bore (8) and slot shaped openings (9) as described above, and in addition, two depressions (14) in the otherwise smooth surface of the outside face, oriented at 90 degrees to the slot shaped openings and of the same length and width as the same openings.

When the inside faces of the endpieces are placed together to close the split, it can be seen that the slot shaped openings (7 & 9) will be in perfect alignment with each other. The connecting device can be then be inserted, lugged end first, into the chamber opening on the outside face of the first endpiece, and through the use of a suitable screw driver, can be pushed so that the lugs will be urged into and all the way through the aligned slot shaped openings of the second endpiece. At this time, the spring (10) of the connecting device will occupy the space in the chamber formed by the large diameter bore (4) and will be compressed between the shelf (6) and the connecting device head (12).

The dimensions of the endpieces and connecting device are such that when the insertion has reached the point where the spring is fully compressed, the lugs will have passed completely through the second endpiece and slightly beyond the outside face thereof. Upon rotation of the screw driver engaged in the head, the connecting device can be rotated until the lugs are aligned with the depressions on the outside face of the second endpiece, and upon release of pressure from the screw driver the connecting device will then hold endpieces together firmly by the tension of the spring between the shelf in the chamber of the first endpiece and the head of the connecting device. The engagement of the lugs in the depressions will keep the connecting device in a locked position due to the tension of the spring, unlike an ordinary screw which could rotate and back out over time.

A second embodiment, not illustrated, is also possible, in which the connecting device in FIG. 3 contains only one lug instead of two. Consequently, only one of the two slot shaped openings are necessary in the endpieces as shown in FIGS. 2 and 4 for such an embodiment.

Figure 5:
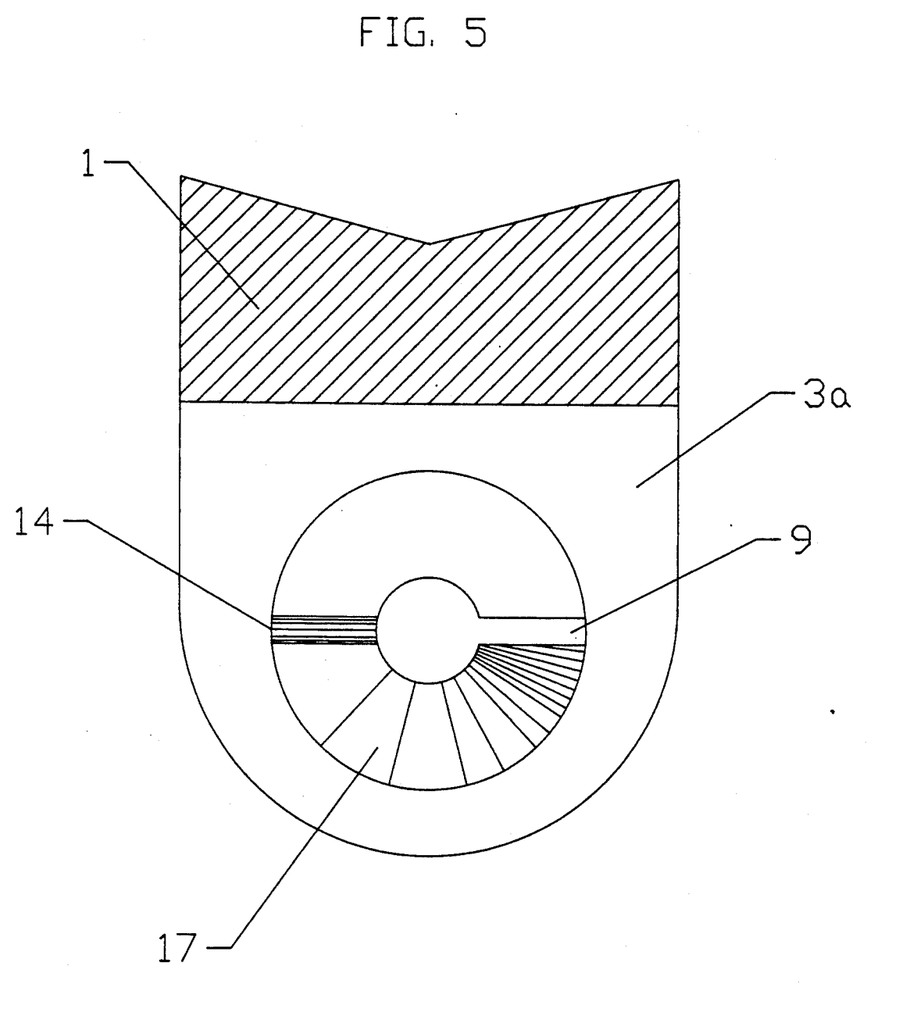
FIGS. 5 & 6 show the outside face of the second endpiece illustrating two possible embodiments.

FIG. 5 shows the outside face of the second endpiece (3) attached to the end of the eyewire (1) for a third embodiment, which also utilizes a connecting device with only one lug and endpieces with only one slot, as described in the second embodiment. In this third embodiment, the surface of the second endpiece over which the lug would rotate (17) is not flat, but would gradually slope upwards from the slot (9) to the depression (14). The part of this surface next to the slot would be somewhat recessed into the face of the endpiece, and the amount of recess would decrease in the direction of the depression (14) until it is become raised to the point where it is substantially flush with the rest of the endpiece face just as it reached the depression (14). Thus, as the connecting device is rotated the effect of this sloping surface will be to gradually increase the tension on the spring and pull the frame closed tightly, until the lug reaches the depression (14) and is locked therein. This will aid in closing the frame by gradually increasing the force as the screw head of the connecting device is rotated.

Figure 6:
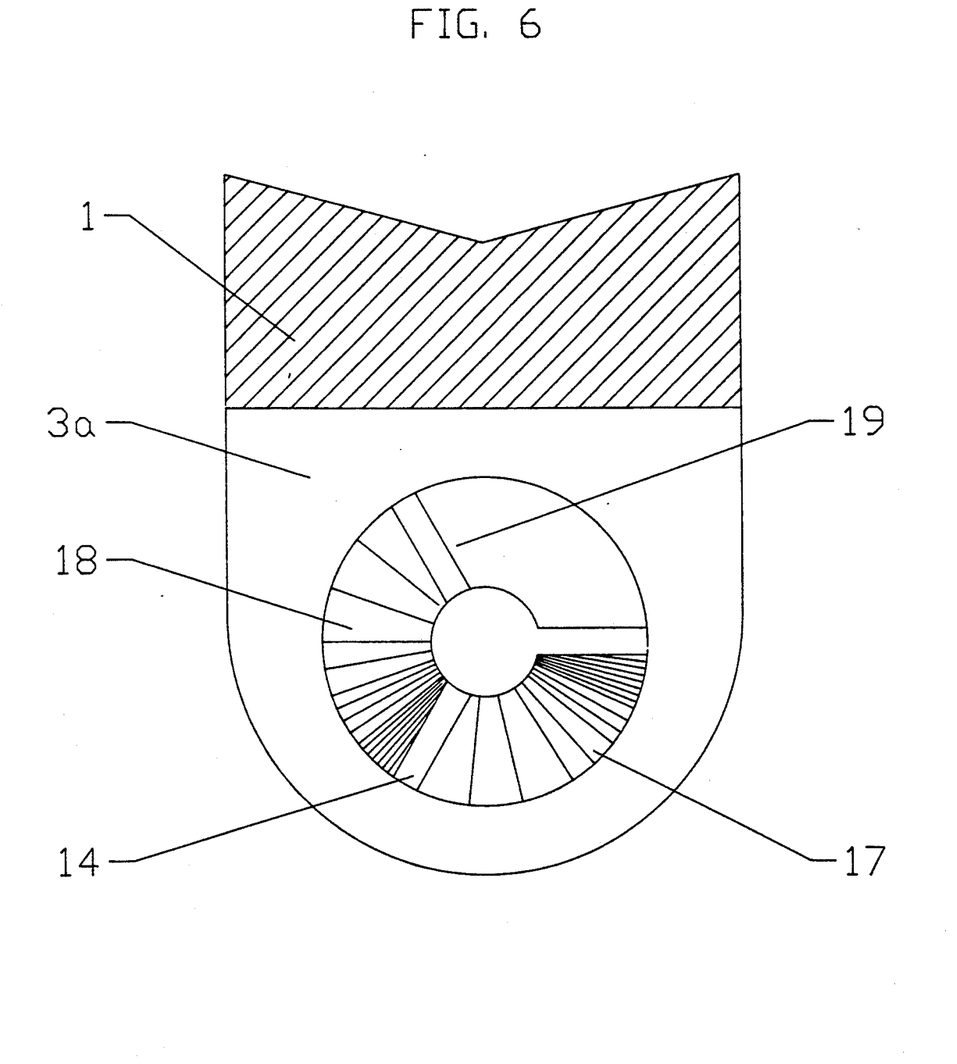

The same principle is used in a fourth embodiment, of which the outside face of the second endpiece is illustrated in FIG. 6. The outside face of the second endpiece for this embodiment differs from the one in from the previously described embodiment in that there are two sections of recessed sloping surface (17 & 18) divided by a first depression (14) between the two sloping sections and the second depression (19) at the far end of the second sloping surface.

When the connecting device is first inserted, the lug will protrude through the slot (9) as in previously described embodiments. Upon rotation of the connecting device the lug will slide up the recessed sloping surface (17) until it reaches the first depression (14). In situations where the lenses have been edged slightly too large for the frame, this first locked position of the connecting device may provide adequate tension on the spring to hold the frame closed securely. If the lenses are the exact size of the frame, the connecting device can then be rotated further in the same direction, causing the lug to slide further upward along the second sloping surface (18) to a second locked position in the depression (19) at the end. This embodiment would therefore be able to cope with lenses which were made slightly too large for the frame, which is not an uncommon situation encountered by opticians or technicians while assembling eyeglasses.

In FIG. 6, there are two locked positions as defined by the two depressions (14 & 19) which are located 120 degrees apart, but the same or a greater number of positions at different combinations of angles would be possible.

Figure 7:
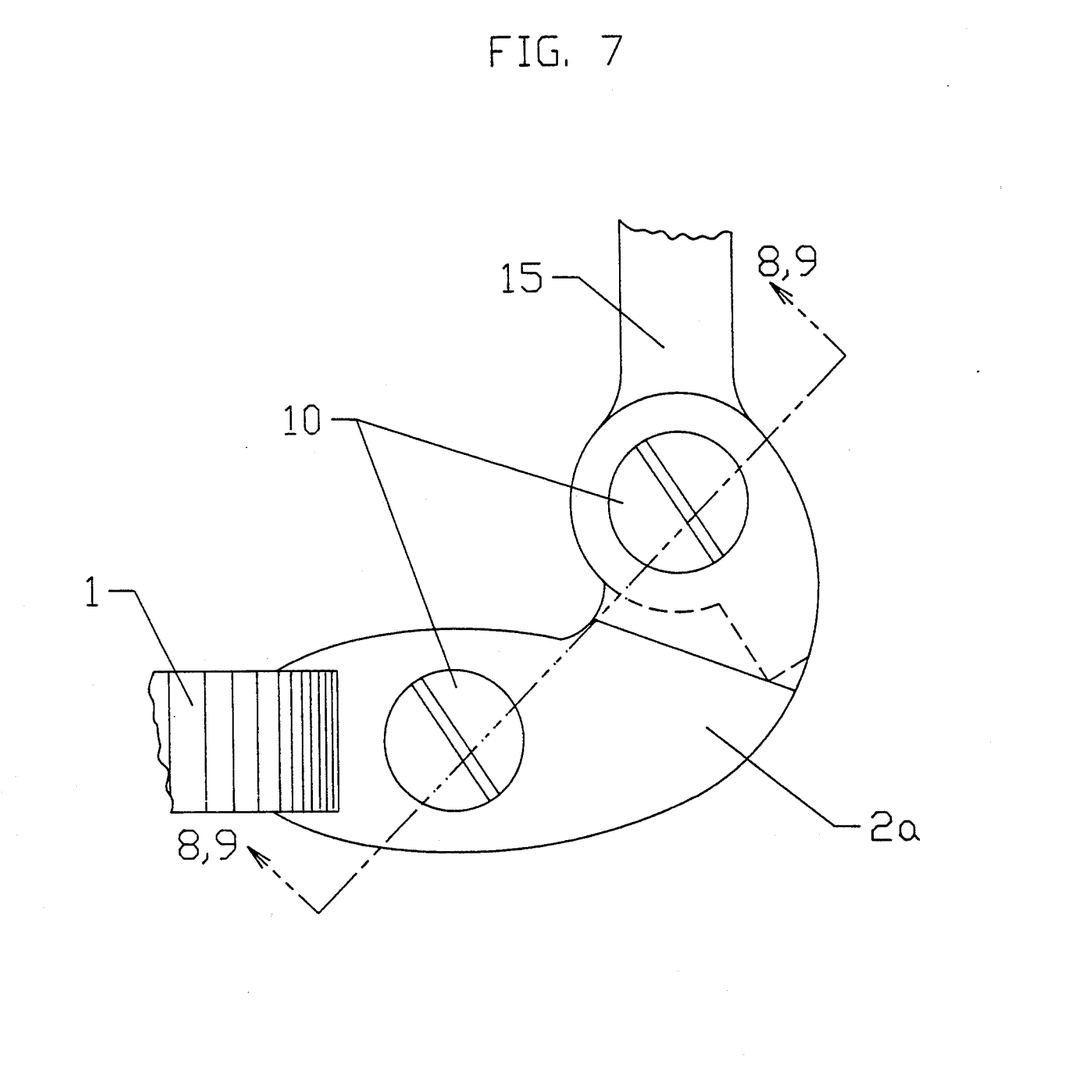
FIG. 7 shows part of a spectacle frame with a different temple attachment design than the frame in FIG. 1.

FIG. 7 shows the eyewire (1) and the outside face of the first endpiece (2a) of a frame utilizing a different method of temple attachment than in FIG. 1. In this type of frame the end of the temple (15) is located between recessed portions of the two endpieces, rather than being connected by means of a separate bracket as for the frame illustrated in FIG. 1. In a fifth embodiment employing the type of temple attachment illustrated in FIG. 7, two connecting devices are used, of which the heads (12) can be seen; the one towards the lower left holds the eyewire tightly together, while the one towards the upper right acts as a pivot on which the temple end rotates.

Figure 8:
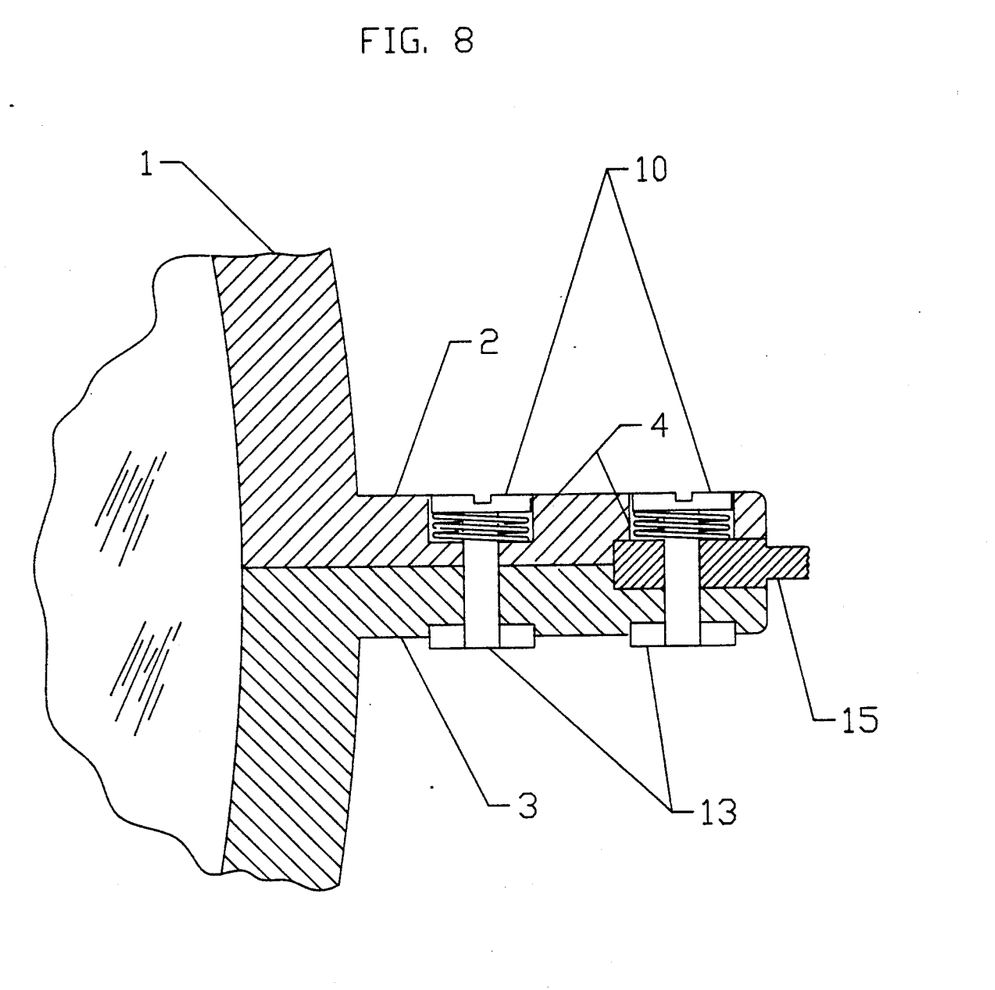
FIGS. 8 & 9 show cross sections along the line 8-9 in FIG. 7 of two additional embodiments.

A cross section of this fifth embodiment along the line 8-9 in FIG. 7 is shown in FIG. 8. Attached to the rim (1) are the endpieces (2 & 3), which are tightly together in the closed position. The connecting device springs, in a compressed state, can be seen located within the chambers formed by the large bores (4) in the first endpiece beneath the heads (12) of the connecting devices. The connecting device is the two lugged type, and the lugs (13) can be seen engaged in the depressions in the outside surface of the second endpiece (3). In this case the connecting device on the left provides tension for holding the eyewire tightly closed, while the connecting device on the right serves to hold the temple end (15) firmly between the endpieces while at the same time acting as a pivot for reciprocating movement of the temple.

Figure 9:
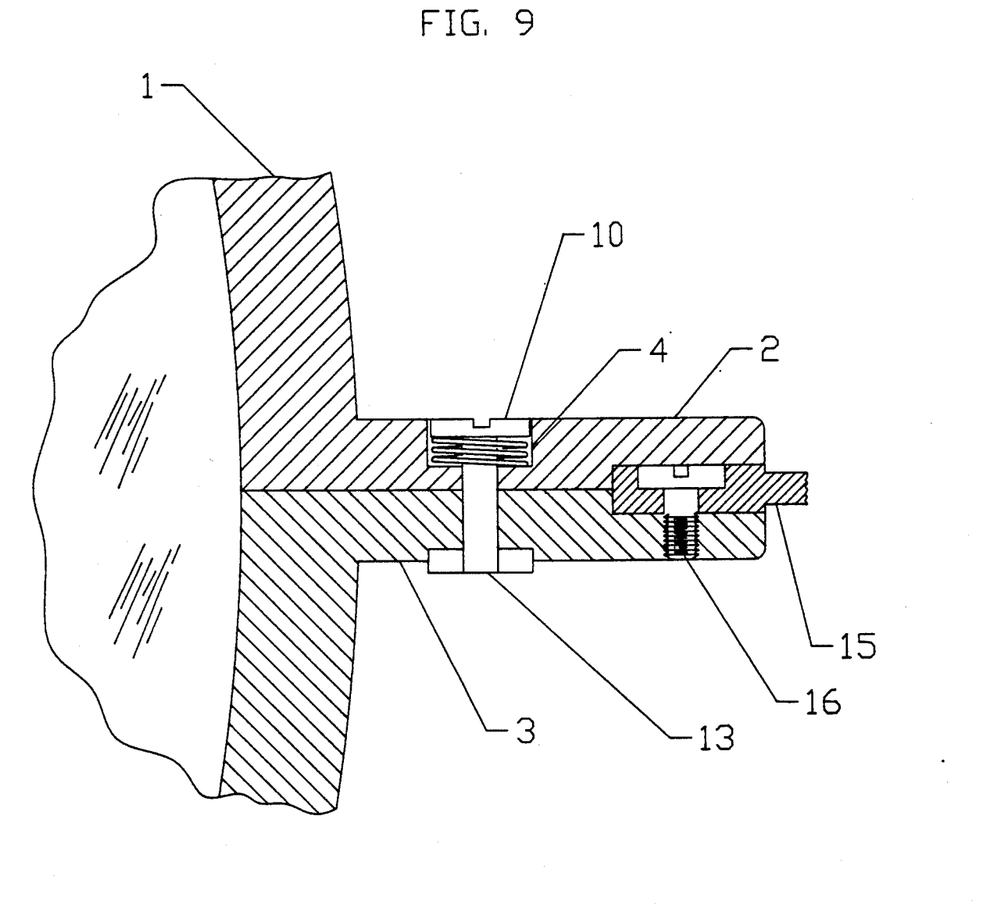

FIG. 9 shows an additional embodiment, similar to the one in FIG. 8 but in this case the temple end (15) is held by a screw (16), the head of which is flush with the top of the temple end. This allows the split in the frame to be opened without having to remove the temple, which would make reassembly of the glasses less awkward when lens replacement was required. When the frame is in closed position, the temple retaining screw will be held tightly beneath the first endpiece, thereby preventing possible loosening of the temple attachment. Thus, this embodiment will address the problems of the loosening of both eyewire and temple attachment screws.

While only a few embodiments of the present invention have been shown and described, it is apparent that numerous alterations, omissions and additions may be made thereunto without departing from the spirit and scope of the invention as defined in the appended claims.

We claim:

in spectacles, eyeglasses, and the like, a frame comprising;

1. A pair of split rims to surround and support an eyeglass lens;

first and second endpieces secured to the ends of the rim respectively on one side and the other side of the split, each endpiece having two opposite faces, with the faces which articulate together when the split is closed being designated as the inside faces, and the face opposite the inside face of each endpiece being designated as the outside face;

a connecting device consisting of a cylinder shaped shaft, one end of the shaft having a head slotted for engagement with a screw driver, the head being substantially larger in diameter than the shaft and smaller in diameter than the narrowest dimension of the of the endpiece faces, at the other end having two lugs of smaller diameter than the shaft which extend perpendicular to the shaft and at 180 degrees to each other, where the total length from the outside end of one lug to the outside end of the other is substantially the same as the diameter of the head, and the total length from the top of the head to the point where the shaft intersects the lugs is substantially the same as the distance between the outside faces of the endpieces when the split is in the closed position;

extending through the first endpiece, from one face to the other, a cylindrically shaped chamber with a smaller diameter section of substantially the same diameter as the shaft of the connecting device positioned towards the inside face and a larger diameter section of substantially the same diameter of the head of connecting device positioned towards the outside face of the first endpiece, with a shelf where the larger and smaller diameter portions of the chamber meet between the two faces, and two oppositely positioned slot shaped openings extending radially outward from the center of the smaller diameter portion of the chamber, so that the cross section of the small diameter section of chamber matches the profile of the lugged end of connecting device;

a compression spring of coil or other type, mounted on the shaft of the connecting device, the outside diameter of the spring not to exceed the diameter of the connecting device head;

extending through the second endpiece, from one face to the other, a chamber having the same cross sectional profile of the small diameter section of the chamber in the first endpiece, and situated in the endpiece in such a way that the chamber openings on the inside faces of the first and second endpieces have their respective chamber opening profiles in alignment with each other when the split is in closed position;

two slight depressions on the outside face of the second endpiece, extending radially outward from the center of the chamber, opposite each other and between the slot shaped openings in the second endpiece.

2. Device as stated in claim 1, where connecting device contains only one lug instead of two.

3. Device as stated in claim 2, where first and second endpiece chambers contain only one slot shaped opening instead of two.

4. Device as stated in claim 3, where outside face of second endpiece has a recessed surface between slot shaped opening and depression, where the surface is recessed the greatest amount adjacent to the slot shaped opening and the surface slopes smoothly upwards until substantially flush with outside face just before reaching the depression.

5. Device as stated in claim 4, where sloping surface is divided into two or more sections by additional radially extending depressions positioned between fully recessed and flush ends of sloping surface.

6. Device as stated in claim 1, having a second connecting device, the endpieces containing a second set of said slotted chambers, where the second set of slotted chambers is located in the endpieces between the first set of slotted chambers and the end of the endpieces opposite the eyewire attachment, the second set of slotted chambers having only a large diameter portion in the first endpiece extending all the way through and no shelf or small diameter section, both endpieces having a recess forming a rectangular shaped slot between the two endpieces which extends from a point between the first and second sets of slotted chambers all the way to the end of the endpieces opposite the eyewire, the frame having a temple end with a flat portion which fits into the rectangular slot formed by the recesses in the two endpieces, the temple end also having a small diameter bore of substantially the same diameter as the connecting device shaft and in alignment with the second set of chamber openings when temple end is positioned in rectangular slot, the temple bore also having radially projecting slot shaped openings as in the endpiece chambers.

7. Device as stated in claim 6, a flat headed machine screw substituted for the second connecting device, the bore in the end of the temple having no slots but instead being shaped so that the shaft of the screw can be inserted through the temple end and the head will be recessed completely within the temple end, the second endpiece having, instead of the second slotted chamber and depressions, a threaded bore for engagement of the screw threads in the same location, the first endpiece having no second chamber.

* * * * *

UNITED STATES PATENT AND TRADEMARK OFFICE
CERTIFICATE OF CORRECTION

PATENT NO. : 5,325,132
DATED : June 28, 1994
INVENTOR(S) : Brian F. Mulrine
Eric M. Loeser It is certified that error appears in the above-indentified patent and that said Letters Patent is hereby corrected as shown below:

On title page, item

[76] Inventors: Brian F. Mulrine, 3547 Bay Ave., Ocean City, N.J. 08226;
Eric M. Loeser, 301 Maple Ave. #235, North Plainfield, N.J. 07060;
Michael Goeggel, 33 Berkshire Dr., Howell, N.J. 07731

Signed and Sealed this

Twenty-ninth Day of November, 1994

Attest:

BRUCE LEHMAN

*Attesting Officer*     *Commissioner of Patents and Trademarks*